United States Patent
Lund et al.

(10) Patent No.: US 7,668,951 B2
(45) Date of Patent: *Feb. 23, 2010

(54) ELECTRONIC MESSAGE SOURCE REPUTATION INFORMATION SYSTEM

(75) Inventors: Peter K. Lund, San Francisco, CA (US);
Scott M. Petry, Palo Alto, CA (US);
Craig S. Croteau, Oakland, CA (US);
Kenneth K. Okumura, Sunnyvale, CA (US); Dorion A. Carroll, Oakland, CA (US)

(73) Assignee: Google Inc., Mountain View, CA (US)

( * ) Notice: Subject to any disclaimer, the term of this patent is extended or adjusted under 35 U.S.C. 154(b) by 726 days.

This patent is subject to a terminal disclaimer.

(21) Appl. No.: 11/137,110

(22) Filed: May 25, 2005

(65) Prior Publication Data

US 2006/0031483 A1    Feb. 9, 2006

Related U.S. Application Data

(60) Provisional application No. 60/574,290, filed on May 25, 2004, provisional application No. 60/593,651, filed on Feb. 2, 2005.

(51) Int. Cl.
*G06F 15/173* (2006.01)
*G06F 15/16* (2006.01)
(52) U.S. Cl. .................. 709/223; 709/206; 709/225; 709/204
(58) Field of Classification Search ............. 709/206, 709/203, 204, 205, 207, 223–226
See application file for complete search history.

(56) References Cited

U.S. PATENT DOCUMENTS

| | | | |
|---|---|---|---|
| 4,837,798 A | 6/1989 | Cohen et al. | |
| 5,619,648 A | 4/1997 | Canale et al. | |
| 5,627,764 A | 5/1997 | Schutzman et al. | |
| 5,634,005 A | 5/1997 | Matsuo | |
| 5,742,668 A | 4/1998 | Pepe et al. | |

(Continued)

FOREIGN PATENT DOCUMENTS

WO    WO 96/35994    11/1996

(Continued)

OTHER PUBLICATIONS http://web.archive.org/web/20000815053401/www.brightmail.com/corporate/overview/.

(Continued)

*Primary Examiner*—William C Vaughn, Jr.
*Assistant Examiner*—Carlos R Perez Toro
(74) *Attorney, Agent, or Firm*—Baker & McKenzie LLP

(57) ABSTRACT

Disclosed herein are filtering systems and methods that employ an electronic message source reputation system. The source reputation system maintains a pool of source Internet Protocol (IP) address information, in the form of a Real-Time Threat Identification Network ("RTIN") database, which can provide the reputation of source IP addresses, which can be used by customers for filtering network traffic. The source reputation system provides for multiple avenues of access to the source reputation information. Examples of such avenues can include Domain Name Server (DNS)-type queries, servicing routers with router-table data, or other avenues.

38 Claims, 6 Drawing Sheets

U.S. PATENT DOCUMENTS

| | | | |
|---|---|---|---|
| 5,771,355 | A | 6/1998 | Kuzma et al. |
| 5,796,948 | A | 8/1998 | Cohen |
| 5,832,208 | A | 11/1998 | Chen et al. |
| 5,844,969 | A | 12/1998 | Goldman et al. |
| 5,889,943 | A | 3/1999 | Ji et al. |
| 5,905,777 | A | 5/1999 | Foladare et al. |
| 5,937,162 | A | 8/1999 | Funk et al. |
| 5,968,117 | A | 10/1999 | Schuetze |
| 5,987,611 | A | 11/1999 | Freund |
| 5,999,932 | A | 12/1999 | Paul |
| 6,014,429 | A | 1/2000 | LaPorta et al. |
| 6,023,723 | A | 2/2000 | McCormack et al. |
| 6,052,709 | A | 4/2000 | Paul |
| 6,061,718 | A | 5/2000 | Nelson |
| 6,073,165 | A | 6/2000 | Narasimhan et al. |
| 6,075,863 | A | 6/2000 | Krishnan et al. |
| 6,092,194 | A | 7/2000 | Touboul |
| 6,112,227 | A | 8/2000 | Heiner et al. |
| 6,118,856 | A | 9/2000 | Paarsmarkt et al. |
| 6,138,146 | A | 10/2000 | Moon et al. |
| 6,146,026 | A | 11/2000 | Ushiku |
| 6,147,987 | A | 11/2000 | Chau et al. |
| 6,178,331 | B1 | 1/2001 | Homes et al. |
| 6,249,805 | B1 | 6/2001 | Fleming, III |
| 6,249,807 | B1 | 6/2001 | Shaw et al. |
| 6,263,202 | B1 | 7/2001 | Kato et al. |
| 6,301,245 | B1 | 10/2001 | Luzeski et al. |
| 6,317,751 | B1 | 11/2001 | Yeger et al. |
| 6,321,267 | B1 | 11/2001 | Donaldson |
| 6,334,140 | B1 | 12/2001 | Kawamata |
| 6,335,966 | B1 | 1/2002 | Toyoda |
| 6,389,276 | B1 | 5/2002 | Brilla et al. |
| 6,404,762 | B1 | 6/2002 | Luzeski et al. |
| 6,411,684 | B1 | 6/2002 | Cohn et al. |
| 6,434,601 | B1 | 8/2002 | Rollins |
| 6,438,215 | B1 | 8/2002 | Skladman et al. |
| 6,442,589 | B1 | 8/2002 | Takahashi et al. |
| 6,453,327 | B1 | 9/2002 | Nielsen |
| 6,487,586 | B2 | 11/2002 | Ogilvie et al. |
| 6,513,045 | B1 | 1/2003 | Casey et al. |
| 6,574,658 | B1 | 6/2003 | Gabber et al. |
| 6,609,196 | B1 | 8/2003 | Dickinson, III et al. |
| 6,615,258 | B1 | 9/2003 | Barry et al. |
| 6,650,890 | B1 | 11/2003 | Irlam et al. |
| 6,654,787 | B1 | 11/2003 | Aronson et al. |
| 6,691,156 | B1 | 2/2004 | Drummond et al. |
| 6,711,618 | B1 | 3/2004 | Danner et al. |
| 6,779,021 | B1 | 8/2004 | Bates et al. |
| 6,868,498 | B1 | 3/2005 | Katsikas |
| 2001/0032095 | A1 | 10/2001 | Balbach |
| 2002/0059454 | A1 | 5/2002 | Barrett et al. |
| 2003/0217140 | A1* | 11/2003 | Burbeck et al. ............. 709/224 |
| 2005/0060535 | A1 | 3/2005 | Bartas |
| 2005/0080855 | A1 | 4/2005 | Murray |
| 2005/0080856 | A1* | 4/2005 | Kirsch .................. 709/206 |
| 2005/0091320 | A1 | 4/2005 | Kirsch et al. |
| 2005/0240617 | A1 | 10/2005 | Lund et al. |
| 2005/0262209 | A1* | 11/2005 | Yu .......................... 709/206 |
| 2006/0031575 | A1* | 2/2006 | Jayawardena et al. ....... 709/239 |

FOREIGN PATENT DOCUMENTS

| | | |
|---|---|---|
| WO | WO 97/12321 | 4/1997 |
| WO | WO 97/27546 | 7/1997 |
| WO | WO 98/37680 A2 | 8/1998 |
| WO | WO 99/06929 | 2/1999 |
| WO | WO 99/65256 | 12/1999 |
| WO | WO 99/67731 | 12/1999 |
| WO | WO 00/42747 | 7/2000 |
| WO | WO 00/49776 A1 | 8/2000 |
| WO | WO 01/46867 | 6/2001 |
| WO | WO02/08938 | 1/2002 |

OTHER PUBLICATIONS http://web.archive.org/web/19990128140052/http://www.chooseyourmail.com/.
http://web.archive.org/web/20000815064559/www.commtouch.com/solutions/index.shtml.
http://web.archive.org/web/20001205151400/mailcircuit.com/route.htm.
http://web.archive.org/web/20000824040241/www.messagelabs.com/about/Overview/Overview.htm.
http://web.archive.org/web/20000816134259/www.antivirus.com/products/email-groupware.htm.
International Search Report, Form PCT/ISA/210 dated Apr. 14, 2004, PCT Application No. PCT/US03/04757.
Supplementary European Search Report, EP 03711094.7 dated Sep. 6, 2005.
European Examination Report, EP 01977347.2 dated Aug. 26, 2005.
"Automated Spam Detection," R. Lonn, Feb. 16, 1999.
EMC News Release, "EMC Launches Centera, Ushers in New Era of Content-Addresses Storage," New York, Apr. 29, 2002, www.emc.com/news/press_releases/view.jsp?id=1254.
CVS.SOURCEFORGE.NET, "Spam Filtering ESMTP Demon", copyright notice dated 2000, publ. at http://cvs.sourceforge.net/viewcvs.py/clocc/clocc/src/donc/smt-p. lisp?rev=1.4.
Bounce Spam Mail, from Albert Yale Software, dated 1997-2000.
CSM Internet Mail Scanner, from CSM-USA, Inc., dated 1999.
CyberSitter AntiSpam, from CyberSitter.com, distributed by Solid Oak Software, circa 1999-2000.
DL MailFilter, from DeadLetter and Leem Han Cheong, dated Nov. 1999.
E-Mail Chompaer, from Lorenzo Pasqualis, dated 1996-97.
E-Mail Remover, from Victor Javier, Virtual Network, Inc., Singapore, dated Mar.-Jul. 1998, and 1999.
FlameThrower, from Eagle Research, Inc., dated 2000.
Interceptor, from Grok Development Ltd., dated 1999-2000.
JOC E-Mail Checker, from JOCSoft and Jose Olice Civit, dated 2000.
Lyris MailShield, from Lyris, undated.
Quickhead-E, from Danere Software Innovations, dated Mar. 2000.
Spam Attack Pro, circa 1996-97, from softwiz.com.
Spam Buster, from Contact Plus Corp., dated 2000.
SpamEater, from High Mountain Software, dated 1997-2000.
BrightMail, from BrightMail, Inc., dated 1997-2000.
Praetor, from Computer Mail Services, Inc., circa 1998-99.
"MsgTo.com Stops Spam Email", web page circa Nov. 19, 1999, from www.applesforhealth.com.
"The Species Filter", by Rafe Needleman, ed., dated Aug. 6, 1999, from www.RedHerring.com.
Official Sep. 1999 AUP (Auto Update Program) v5.0 Build 447, Product Update Release, winserver.com.
Supplementary European Search Report, EP 01977347 dated Apr. 7, 2005.
Nanog 9709: Re: BGP blackholing spam [was Spammer Bust]. (Sep. 6, 1997). Retrieved Feb. 27, 2007, from http://www.irbs.net/internet/nanog/9709/0109.html.
PCT/US05/18548, International Search Report and Written Opinion dated Nov. 7, 2006.
"IronPort Previews "SenderBase" at DEMO 2003 New Information Service for IT Administrators to debut on DEMO stage"; San Bruno, CA, Feb. 16, 2003; pp. 1-2. www.ironport.com.

* cited by examiner

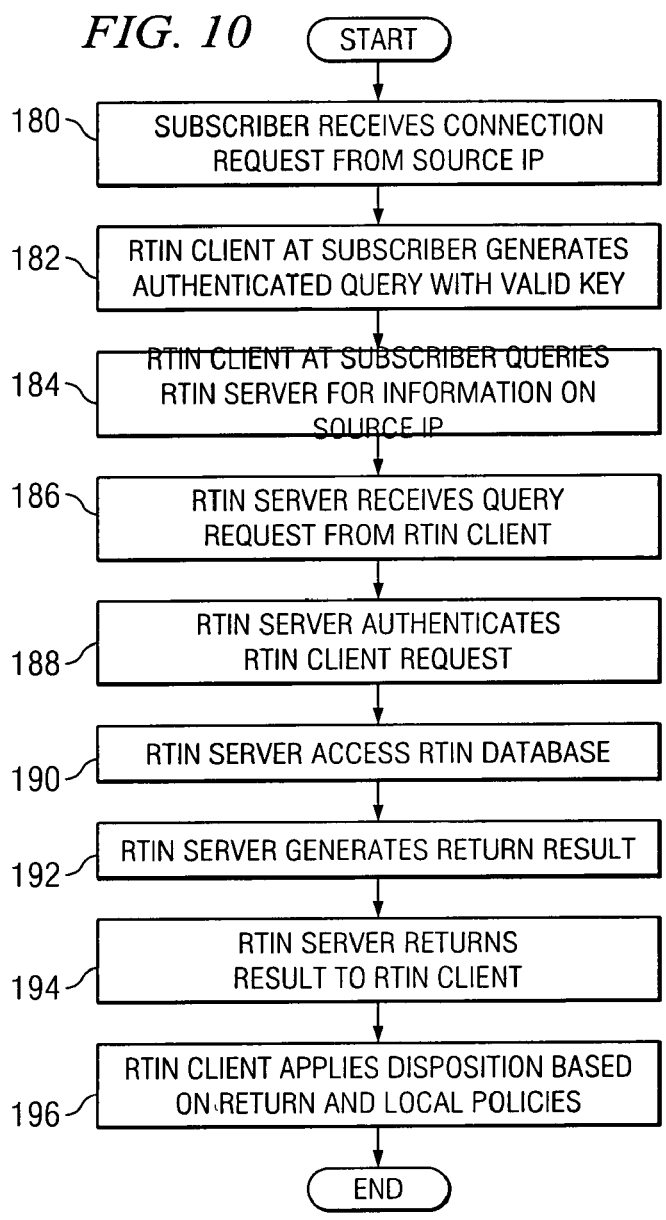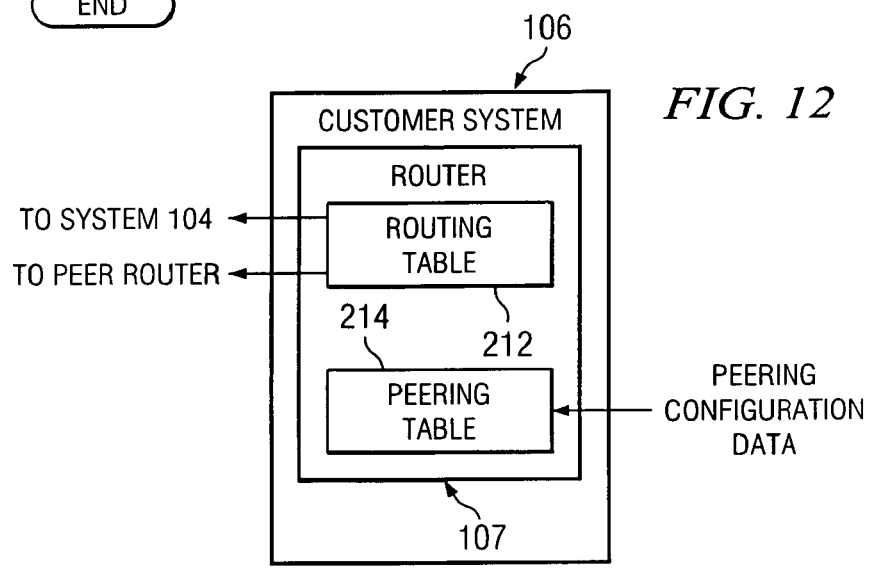

ELECTRONIC MESSAGE SOURCE REPUTATION INFORMATION SYSTEM

CROSS-REFERENCE TO RELATED APPLICATIONS

This Application claims the benefit of U.S. Provisional Application No. 60/574,290, filed May 25, 2004, the entire content of which is hereby incorporated by reference for all purposes. This Application also claims the benefit of U.S. Provisional Application No. 60/593,651, filed Feb. 2, 2005, the entire content of which is hereby incorporated by reference for all purposes.

TECHNICAL FIELD

Disclosed embodiments herein relate generally to systems for monitoring network activity, creating pools of information reflecting the monitored activity, and managing network activity based on information reflective of the monitored activity.

BACKGROUND

U.S. Patent Application Publication No. 2003/0158905 to Petry et al. (the "Active EMS patent application") is hereby incorporated by reference in its entirety for all purposes. The Active EMS patent application describes an active electronic message management system that includes a real-time feedback loop where data is collected from the electronic messages on incoming connection attempts, outgoing delivery attempts, and message content analysis, and written to a data matrix.

As of May 2005, Postini, Inc., the Assignee of the present disclosure, processes more than 3 billion messages per week. Information gathered from this processing provides valuable insight into the activities on the email traffic on the Internet. Offensive email traffickers or "spammers," having been thwarted by content-based email message filtering have begun using brute-force methods to overcome the many email message filtering products and services in existence. These brute force methods in many cases are not even so much a threat to end-users' message boxes as they are an overall burden on the servers and networks of the Internet—including routers maintained by ISPs, universities, and corporate networks. For example, in some cases spammers will send millions of random messages for the purpose of affecting the filtering parameters of content-based email filters, as those filters generally are adaptive to message traffic patterns on the Internet. These messages will accordingly not even include commercial advertisements. They will not generally be repetitive in nature, but random, and sent to random known email addresses in the spammers' databases. Since the messages will not have a known pattern, content-based email filters, which are not configured to block messages based on detecting offensive senders of email messages by source address, will generally allow these messages to pass through to users. Further, since much of such email filtering is performed at the corporate or ISP location, and sometimes as far back as the mail server for the end user or even at the users' personal email clients, this type of email filtering does nothing to reduce the level of network traffic that an ISP or corporate network must process.

SUMMARY

Disclosed herein are filtering systems and methods that employ an electronic message source reputation system. The source reputation system maintains a pool of source Internet Protocol (IP) address information, in the form of a Real-Time Threat Identification Network ("RTIN") database, which can provide the reputation of source IP addresses, and which can be used for filtering network traffic by customers of the source reputation system. The source reputation system provides for multiple avenues of access to the source reputation information. Examples of such avenues can include Domain Name Server (DNS)-type queries, servicing routers with router-table data, or other avenues.

Various aspects of this overall concept include systems and methods for populating the pool of source IP address reputation information, authentication processes for accessing the source reputation information (e.g., via encryption keys, etc.), types of information maintained in the source reputation information pool, and methods of accessing or providing the source reputation information.

The source reputation information can be derived from a variety of data sources. One example of a data source is a traffic monitoring system that yields real-time Internet traffic information. The traffic monitoring system can include a traffic monitor that is configured to collect real-time information based on email traffic. The traffic monitor can maintain a traffic log that includes data reflecting the information collected by the traffic monitor. An analysis of the traffic log can then be performed by the source reputation system in order to develop an assessment of email activity originating from various domains or IP addresses. An assessment of a domain can be delayed until a threshold amount of email traffic from that domain has been evaluated.

Another example of a data source a two-strikes system that provides a way of reducing false-positive spam identification. When the two-strikes system suspects an email from a given IP address is spam, it will check the amount of time that has elapsed since a suspected spam email was last received from that IP address. If a prescribed amount of time or more has elapsed, then the two-strikes system will consider there to be a small likelihood that the suspect email is spam. Otherwise, if less than the prescribed amount of time has elapsed, then the system considers there to be a greater likelihood that the suspect email is spam and identify the sending IP address as a likely source of spam. The two-strikes system can maintain a database of information stemming from this process, for example, listing IP addresses that are determined to be likely sources of spam. This information can then be provided as a data source to the source reputation system.

Still another example of a data source can be a system for detecting spam based on received email that is addressed to known non-existent email addresses, for example, a "sudden-death" system. A sudden-death system can provide a way of identifying sources of spam based on instances of email messages addressed to non-existent email addresses. High volumes of email sent to non-existent email addresses can be an indication of a directory harvest attack (DHA), so the source IP address can be identified as a source of DHAs and a likely source of spam. The sudden-death system can detect email that is addressed to non-existent email addresses in a variety of ways. In some cases, the sudden-death system can compare delivery addresses of incoming email to a list of mailbox patterns that include character combinations that are unlikely to be used in an real mailbox address. Also, "seed" email addresses that belong to no real user can be circulated on the Internet, "usenet," or other places. The sudden-death system can then detect email that is sent to one of these "seed" addresses and tag the source IP address as a likely source of spam. The sudden-death system can include a database for storing information related to instances of email addressed to non-existent or "seed" addresses. The database can also store IP address information, for example, IP addresses that have been determined by the sudden-death system to be likely sources of spam and/or DHAs. This information can then be provided as a data source to the source reputation system.

Still further examples of data sources can include an IP address information database (or databases). The information can be provided by customers who provide information regarding received spam and IP addresses that sent the spam. The information can also be provided by system administrators regarding IP addresses. An IP address information database can include block-lists, such as lists of IP addresses that are known sources of spam or other malicious activity. An IP address information database can include IP addresses that have been "gray-listed" as being trustworthy to some degree, for example, where the IP addresses are scored according to their degree of trustworthiness. An IP address information database can also include lists of trusted IP addresses that are known to be unlikely sources of spam or other malicious activity.

Trusted IP addresses can be identified through a process that involves identification of domains that would seem unlikely to be sending spam. This can include assigning trust levels to IP addresses based on anticipated behavior, where the trust levels span many degrees of likelihood that spam would or would not be sent out. The trust levels can be based on, among other things, business, industry or other heuristics. IP addresses can be identified as being associated with certain industries, for example, a block of IP addresses might be identified as belonging to a financial or legal institution or even a "general trust" category that encompasses any number of generally trustworthy entities. In some embodiments, a category can be tied to a certain trust level, so IP addresses or domains assigned to a category are automatically assigned the associated trust level.

If, historically, a particular IP address is a known source of spam, or other malicious or undesirable Internet activity, this information can be maintained in an IP address information database. If, historically, an IP address is known to be a source of acceptable email or other Internet traffic, this information can also be stored in the IP address information database. In some embodiments, IP addresses can be flagged or rated based on historical information. A flag or rating can be indicative of acceptable or undesirable past activity. In some embodiments, an escalating activity detection system can be implemented that is capable of reducing the rating, e.g., indicating a reduced level of trustworthiness, of an IP address based on detection of an escalation of malicious activity originating from the IP address or block of addresses. An IP address can also regain improved ratings, e.g., become considered more trustworthy, if a notable reduction in spam or other malicious activity is detected over some span of time. This information can be updated at predetermined intervals based on real-time traffic information from Internet traffic monitors.

The source reputation system includes an RTIN engine the can evaluate an IP address based on information received from a data source or data sources. Any number of risk metrics can be used in order to arrive at a degree of trustworthiness or determination of whether the domain or IP address can be trusted. Examples of risk metrics can include metrics related to spam, viruses, email bombs, and directory harvest attacks. Measurements for each of these metrics can be made on a predetermined scale, for example, a scale ranging from 1 to 100, indicating the degree to which the subject source IP address has been engaging in these behaviors. An IP address can then be flagged based on these measurements, for example, a score in a range of 50 to 100 for a spam measurement can mean the subject IP address is considered a significant source of spam. Otherwise, if the spam measurement is below 50, then the IP address can be trusted to a certain degree, where the level of trustworthiness depends on the measurement value. For example, an IP address with a spam measurement in a range of 1-10 is considered more trustworthy than an IP address having a spam measurement in a range of 40-50.

In some embodiments, an owner of an IP address can be identified (e.g., by performing a DNS or "whois" research operation) in order to factor into the assessment of the IP address an industry factor indicative of how much more or less an IP address is to be a source of spam or other malicious activity given the industry or entity that owns the IP address. Domains or IP addresses that achieve a predetermined level of trustworthiness can be positively identified as such. In some embodiments, domains or IP addresses identified as being trustworthy can be added to a database of trusted IP addresses.

Types of information maintained in the RTIN database can include information such as data indicating, for IP addresses or blocks of IP addresses, the likelihood that the subject address is a likely source of spam, viruses, DHAs, or other malicious activities. For example, the RTIN database can include, for each IP address, a score for one or more categories, such as spam, virus, or DHAs, where the score provides an indication as to how likely the subject IP address is to be engaging in the activity associated with the respective category. Queries to the source reputation database can vary from requests for specific types of information to more general requests, for example, requesting all available information associated with a particular IP address or block of addresses.

Specific architectures for populating, storing, and providing access to the source reputation database can vary. Examples of suitable architectures are disclosed herein, but other architectures can be used without departing from the spirit and scope of the present disclosure.

BRIEF DESCRIPTION OF THE DRAWINGS

Embodiments are illustrated by way of example in the accompanying figures, in which like reference numbers indicate similar parts, and in which:

FIG. 10 shows a flowchart illustrating an embodiment of a process for accessing the source reputation system shown in FIG. 1;

FIG. 12 shows a block diagram of an example of a customer router; and

DETAILED DESCRIPTION

Figure 1:
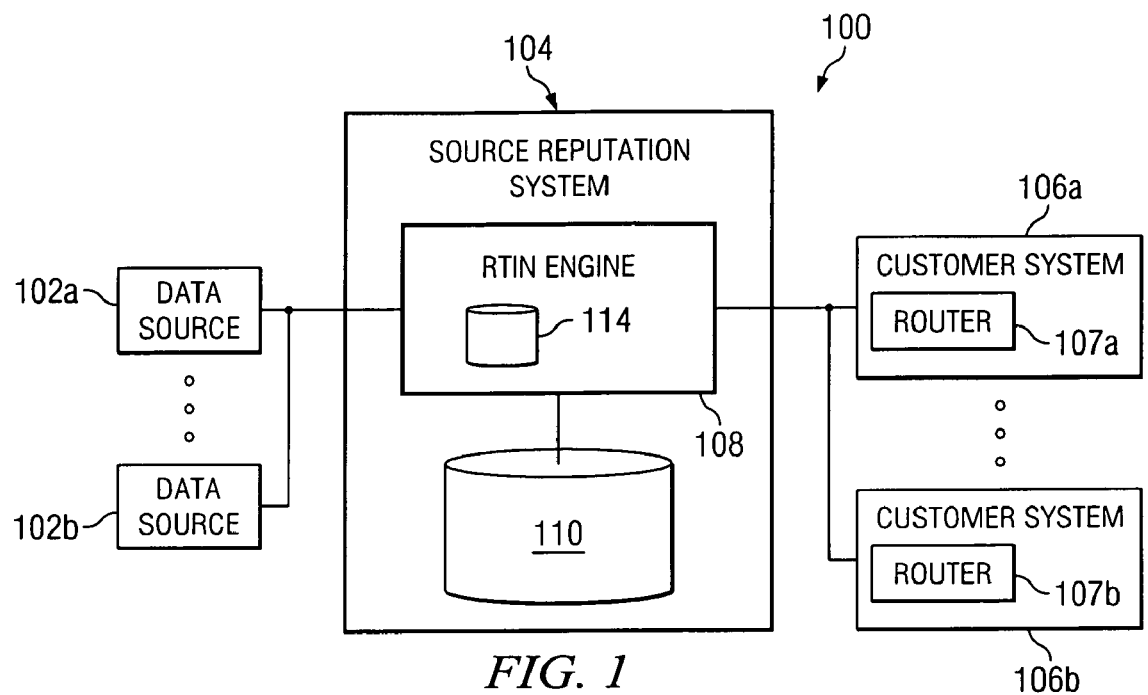
FIG. 1 shows a block diagram illustrating an example of a source reputation system.

FIG. 1 shows a block diagram illustrating an example filtering system 100 that provides for filtering of network traffic based on a reputation of a source IP address. According to the illustrated embodiment, system 100 includes one or more data sources 102a, 102b (collectively "102"), a source reputation system 104, and one or more customer systems 106a, 106b (collectively "106"). The source reputation system 104 includes a Real-time Threat Identification (RTIN) engine 108 and an optional customer configuration database 110.

The RTIN engine 108 is responsible for retrieving IP address information from any number of data sources 102, processing the retrieved information in order to develop and maintain source reputation profiles for IP addresses or blocks of IP addresses in an RTIN database 114, and manage distribution of the source reputation profile information to customer systems 106. Note that the customer systems 106a and 106b include customer routers 107a and 107b (collectively "107"), respectively. In some embodiments, the RTIN engine 108 can manage distribution of the profile information directly to the customer routers 107. In some embodiments, the RTIN engine 108 can manage distribution of the IP address profile information according to customer information stored in the database 110. For example, the information distribution methods and types of information provided to customer system 106a can differ from that of customer system 106b. The RTIN engine 108 can refer to data stored in the database 110 for ensuring appropriate handling of customers 106a and 106b according to their unique preferences and/or configurations.

The RTIN engine 108 can evaluate an IP address based on information received from one or more of the data sources 102. Any number of risk metrics can be used in order to arrive at a degree of trustworthiness or determination of whether the source/domain can be trusted. Examples of risk metrics can include metrics related to spam, viruses, email bombs, and directory harvest attacks. Measurements for each of these metrics can be made on a predetermined scale, for example, a scale ranging from 1 to 100, indicating the degree to which the subject source IP address has been engaging in these behaviors. An IP address can then be flagged based on these measurements, for example, a score in a range of 50 to 100 for a spam measurement can mean the subject IP address is considered a significant source of spam. Otherwise, if the spam measurement is below 50, then the IP address can be trusted to a certain degree, where the level of trustworthiness depends on the measurement value. For example, an IP address with a spam measurement in a range of 1-10 is considered more trustworthy than an IP address having a spam measurement in a range of 40-50.

In some embodiments, an owner of an IP address can be identified (e.g., by performing a DNS or "whois" research operation) in order to factor into the assessment of the IP address an industry factor indicative of how much more or less likely an IP address is to be a source of spam or other malicious activity given the industry or entity that owns the IP address. Domains or IP addresses that achieve a predetermined level of trustworthiness can be positively identified as such. In some embodiments, domains or IP addresses identified as being trustworthy can be added to a database of trusted IP addresses.

For generating the RTIN database 114, an administrator of the source reputation system 104 can query and evaluate combinations of the various fields of information available at the various data sources 102, such as for instance, the ratio of the number of messages to the number of spam messages sent from a particular IP address. Other measures include, but are not limited to:

Number of messages delivered
Number of messages considered spam
Number of recipients
Number of connection attempts
Number of connection successes
Number of connection failures
Number of 400-class errors
Number of 500-class errors
Average message size in bytes
Average connection duration
Number of viruses The RTIN engine 108 can sweep through some or all of the data sources 102, querying which source IP addresses violate spam attack policies, directory harvest attack policies, virus policies, or denial-of-service attack policies, or the RTIN engine 108 can rate or categorize source IP addresses according to analysis of the data within the data sources 102.

The RTIN database 114 will allow a particular source IP address to clear its records, but it doesn't necessarily receive a clean bill of health at the same rate as it developed its bad record. For example, it might take ten "clean" passes in order to decrement the DHA score of a source IP address. These rates can be adjusted according to experimental observations or design goals, and they could even be different under different circumstances—e.g., severity/level of prior attacks or other known information about the IP address.

Procedurally, the RTIN engine 108, based upon requests from the customers 106, can serve IP address-specific values in a comma-separated list of name/value pairs. This provides great flexibility for adding additional values and for backward compatibility with previous systems.

As previously mentioned, it is possible to develop positive reputations instead of negative ones, such as through knowledge of industry-specific IP address ranges. Thus, certain source IP addresses—servers owned by, e.g., IBM or 3M or GM—could be strongly presumed to be sending valid emails and not spam or DHA or the like. This rating could then comprise a positive reputation score that could be returned with a source reputation inquiry from a customer 106. It may also be possible to provide more granular industry specific information, such as medical, legal, or accounting, such that IP addresses belonging in one of those industries would be even less likely to be blocked for customers belonging to one of those industries.

Differentiating elements of the source reputation system 104 relative to approaches previously detailed, such as caller-ID type systems and black lists, are that the RTIN database 114 is objectively based on measures made by the system 104 based on network performance. It does not require people to log or report spammers. Put succinctly, the source reputation system 104 does not care who you say you are or who you have registered with. If you are doing bad things, you will be identified as doing bad things and it will affect the performance of your sent email as filtered by customer systems 106 instructed by the RTIN database 114. Caller ID will not stop people sending spam from known servers, it will only block emails sent from servers other than those associated with the SMTP-information identified for the particular emails, so caller ID is not going to be a complete solution to spam. Furthermore, caller-ID approaches do not protect against directory harvest attacks, because caller-ID evaluation requires access to the payload of a message. The heuristics-based approach, however, can in many cases thwart emails from spammers merely by the emails' association with source IP addresses that have been determined to be actively used by spammers, or actively used by legitimate senders, such as certain industries or type of business. For an extensive discussion of such an industry heuristics approach to filtering, refer to U.S. patent application Ser. No. 10/832,407, entitled "System and Method for Filtering Electronic Messages Using Business Heuristics," which is commonly assigned with the present disclosure and incorporated herein by reference in its entirety for all purposes.

Types of information maintained in the RTIN database can thus include information such as data indicating, for IP addresses or blocks of IP addresses, the likelihood that the subject address is a likely source of spam, viruses, DHAs, or other malicious activities. For example, in some embodiments the RTIN database can include, for each IP address, a score for one or more categories, such as spam, virus, or DHAs, where the score provides an indication as to how likely the subject IP address is to be engaging in the activity associated with the respective category.

Figure 2:
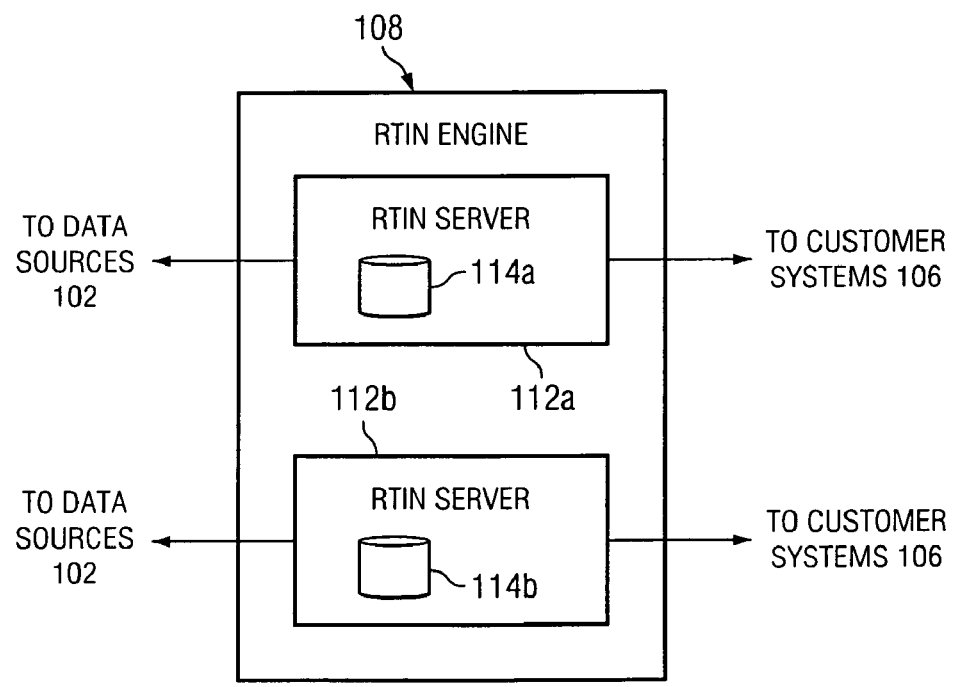
FIG. 2 shows a block diagram of a first embodiment of an RTIN engine.

FIG. 2 shows a block diagram of a first embodiment of the RTIN engine 108. According to the first embodiment, the RTIN engine 108 comprises one or more RTIN servers. In the illustrated example, the RTIN engine 108 includes primary and secondary RTIN servers 112a and 112b (collectively "112"). Each of the servers 112 is capable of processing and storing the same information. This way, the service provided to customers 106 can be uninterrupted if one of the servers 112 is down for maintenance or other reasons. Thus, the use of multiple RTIN servers 112 allows for a more robust system 104. Alternative embodiments can include any number of RTIN servers 112.

Each of the RTIN servers 112 includes an RTIN database 114a, 114b (collectively "114"), where source IP address reputation information is maintained. The RTIN servers 112 can be configured to periodically query the data sources 102 for IP address information, process the IP address information in order to develop data for the IP address's source reputation profile, and update the profile data in an RTIN database 114 accordingly. In embodiments that include more than one RTIN server 112 such as that shown in FIG. 2, each of the servers 112a and 112b can include a respective RTIN database 114a, 114b containing identical information.

The RTIN servers 112 also manage distribution of source IP address reputation information to customers 106. The servers 112 are accessible to the customers 106, although in some embodiments this access can be limited and managed as necessary. For example, the RTIN servers 112 can be configured to allow secured and authenticated access to the data in the RTIN databases 114 by only customers 106 that subscribe to the source reputation system 100. The customers 106 can query the servers 112 and receive a response based on information stored in the RTIN databases 114.

The data stored in the RTIN databases 114 can be accessed by customers or provided to customers in any of a number of different ways. One way in which the RTIN data can be accessed is through a DNS-type lookup algorithm, by which the customers 106 send authenticated DNS-type inquiries that are handled by RTIN controllers (associated with the RTIN servers 112 (see FIG. 3)). These DNS-type lookups can be sent by the customers 106 to find out, for a particular sending server IP address (for a sending email server that is requesting an SMTP connection), whether that sending server has a bad or good reputation.

The RTIN controllers can reference customer data stored in the customer configuration database 110. Thus, for instance, customer 106a may send a DNS-type inquiry for a sending server IP address to the system 104. This inquiry is handled by one of the RTIN servers 112. The RTIN server 112 can serve information from its RTIN database 114 according to configuration information in the customer configuration database 110. A response to the customer's inquiry can include providing, to the RTIN customer 106, scores indicating whether the particular sending server IP address is likely to be associated with spam, or directory harvest attacks, or denial-of-service attacks, or, on the positive side, a positive score can be associated with a particular sending server, indicating that the sending server is likely to be associated with legitimate email. These look-ups can be done in real-time, as the subscribers' email systems receive email connection requests.

Figure 3:
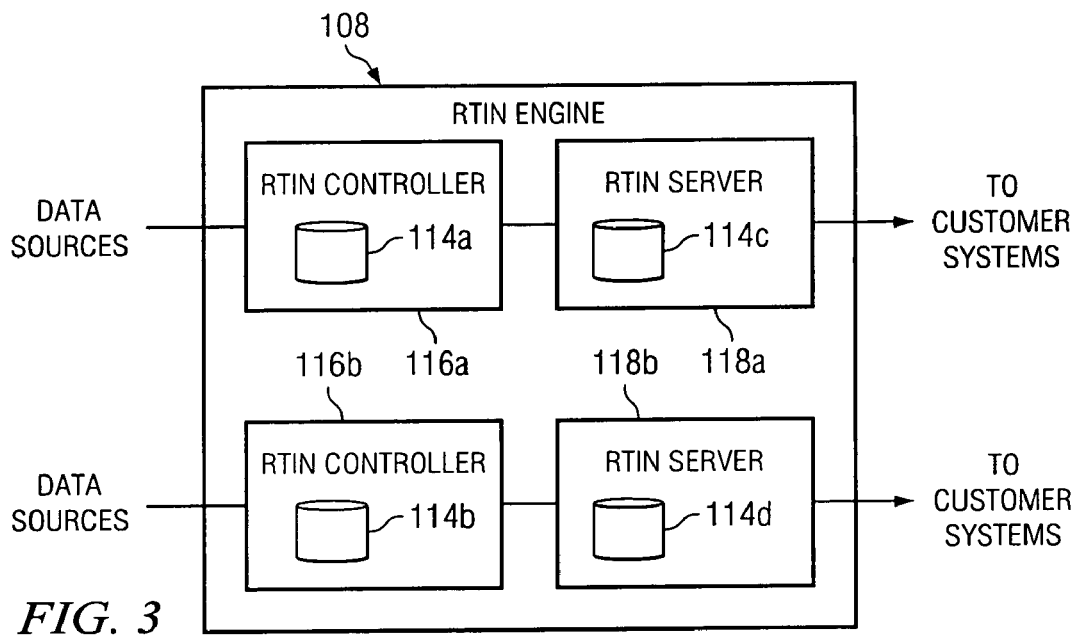
FIG. 3 shows a block diagram of a second embodiment of an RTIN engine.

FIG. 3 shows a block diagram of a second embodiment of the RTIN engine 108. The second embodiment differs from the first embodiment in that the functions performed in the first embodiment by the RTIN server 112 are, in the second embodiment, divided between an RTIN controller 116a, 116b (collectively "116") and an RTIN server 118a, 118b (collectively "118"). Thus, according to the second embodiment, the RTIN engine 108 comprises one or more RTIN controllers 116 and one or more RTIN servers 118. Each of the controllers 116 and servers 118 maintain respective RTIN databases 114a, 114b, 114c, 114d (collectively "1114"). As in the first embodiment, the use of multiple pairs of controllers 116 and servers 118 allows for a more robust system 104.

The division of duties between the RTIN controller 116 and the RTIN server 118 can vary. For example, the RTIN controller 116 can be responsible for periodically querying the data sources 102 to collect IP address information, processing the IP address information to develop source IP address reputation data, and updating the RTIN databases 114 of both the controller 116 and the server 118. The RTIN server 118 can be responsible for managing distribution of the source IP address reputation information stored in its RTIN database 114 to customers 106, including handling queries from the customers 106.

Turning back to FIG. 1, the source reputation system 104 can access any number of data sources 102. While the block diagram shows two data sources 102a and 102b, it should be noted that any number of data sources 102 could be used without departing from the scope of the present disclosure.

Figure 4:
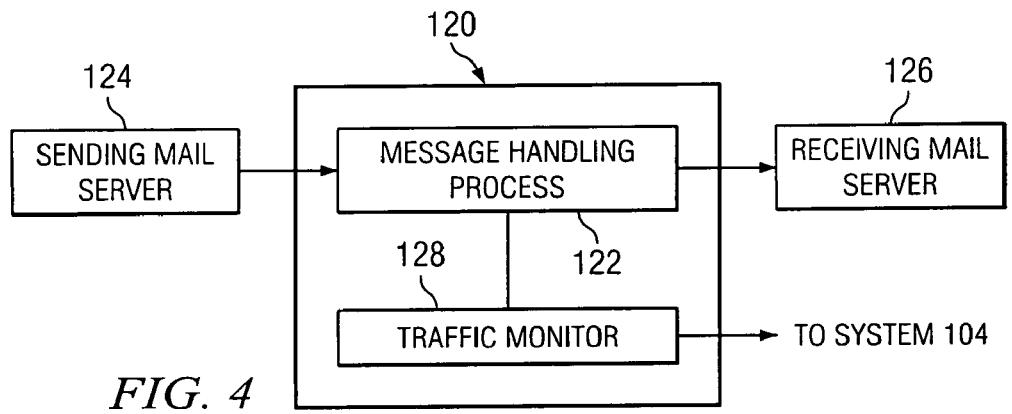
FIG. 4 shows a block diagram of an embodiment of a traffic monitoring system.

Specifics of the data sources 102 can also vary. In some embodiments, for example, a system that monitors email traffic could be used as a data source 102. FIG. 4 shows a block diagram of an embodiment of an email traffic monitoring system 120. The traffic monitoring system 120 generates real-time email traffic statistics. The traffic monitoring system 120 can include components and processes of the active electronic message management system described in the Active EMS patent application (referred to above). The traffic monitoring system 120 includes a message handling process 122. The message handling process 122 is responsible for setting up and monitoring incoming SMTP connection attempts from sending electronic mail servers, such as the server 124, to receiving mail servers, such as the server 126.

The process 122 is connected to a traffic monitor 128. The traffic monitor 128 collects real-time incoming SMTP connection data, message metadata, and message delivery information, including source and destination data from the process 122. The source and destination data can include source data associated with the sending mail server 124, and destination data associated with the receiving mail server 126. Specific examples of data points maintained by the traffic monitor 128 can include, for each combination of source IP address and destination data/information:

- Number of connections made to traffic monitoring system 120 by the source in the last minute
- Number of connections from the source which are currently open
- Number of connections made by traffic monitoring system 120 to a customer on behalf of the source in the last minute
- Number of connections made by traffic monitoring system 120 to a customer on behalf of the source which are currently open
- Number of failed connection attempts made by traffic monitoring system 120 to a customer on behalf of the source
- Mean and standard deviation of the duration of connections from the source to traffic monitoring system 120
- Mean and standard deviation of the duration of connections made by traffic monitoring system 120 to a customer on behalf of the source
- Mean and standard deviation of the size of all messages from the source to the customer
- Mean and standard deviation of the number of recipients on messages from the source to the customer
- Number of messages sent by the source to the customer (total)
- Number of messages sent by the source to the customer which the traffic monitoring system 120 identified as spam
- Number of messages sent by the source to the customer which the traffic monitoring system 120 identified as including a virus
- Number of messages sent by the source to the customer which the traffic monitoring system 120 bounced due to a connection management record
- Number of messages sent by the source to the customer which we blackholed due to a connection management record
- Number of messages sent by the source to the customer which we quarantined due to a connection management record
- Number of messages sent by the source to the customer which the traffic monitoring system 120 spooled
- Number of 400-class errors seen on connections involving the source and the customer
- Number of 500-class errors seen on connections involving the source and the customer.

Thus, the traffic monitoring system 120 can store real-time statistics according to source IP addresses for sending servers being routed through the system 120.

Although FIG. 4 shows the traffic monitors as a single traffic monitor 128, a practical implementation can have fewer or more traffic monitors. It may, for example, be desirable to divide the traffic monitors according to geographies or primary languages of subscribers.

In some embodiments, the traffic monitoring system 120 can be responsible for maintaining relatively short-term information on all the sending servers or Message Transfer Agents ("MTAs"), for example, for sixty seconds. All of those sending IP addresses are stored in a memory grid within the traffic monitor 128, which maintains multiple pieces of information about those source IP addresses, such as how many messages they have sent, how many "500 errors" they have generated or other types of errors, and how many spam messages they have sent based on content scanning. In some embodiments, at any time the traffic monitoring system 120 can be configured to only know what has happened during the last 60 seconds, although if a single connection is open longer than 60 seconds, the traffic monitoring system 120 can continue accumulating data on that connection for as long as the connection lives.

Figure 5:
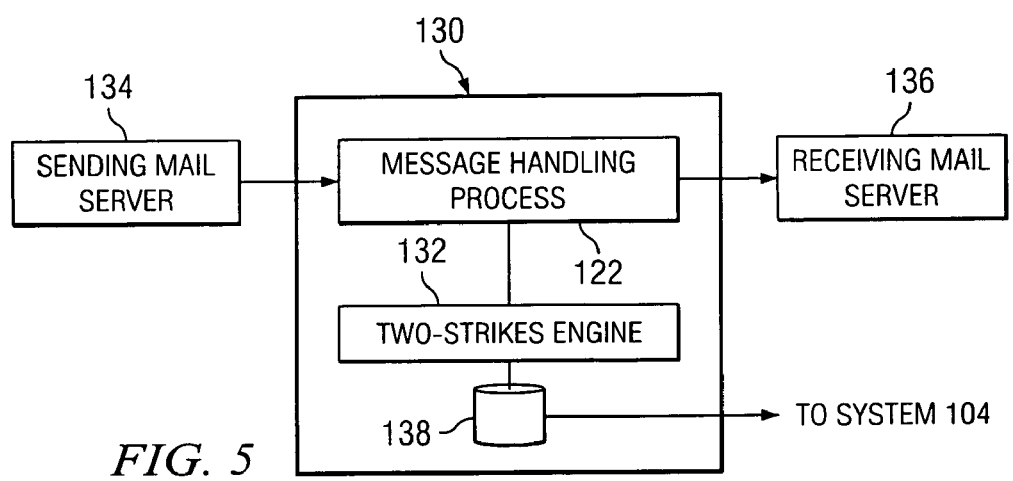
FIG. 5 shows a block diagram of an embodiment of a two-strikes system.

Another example of a data source 102 can be a system that monitors email and detects IP addresses that are sources of spam based on volume of email for a given period of time. FIG. 5 shows a block diagram of an embodiment of such a system. The system shown in FIG. 5 is a two-strikes system 130. The two-strikes system 130 provides a way of reducing false-positive spam identification. An IP address sending an email that is falsely identified as spam will typically not send a high volume of email that is being identified as spam. Thus, when the two-strikes system 130 suspects an email from a given IP address is spam, it will check the amount of time that has elapsed since a suspected spam email was received from that IP address. If a prescribed amount of time or more has elapsed, then the two-strikes system 130 will consider there to be a small likelihood that the suspect email is spam. Otherwise, if less than the prescribed amount of time has elapsed, then the system 130 considers there to be a greater likelihood that the suspect email is spam and identify the sending IP address as a likely source of spam.

The two-strikes system 130 includes a message handling process 122, such as the process 122 described with reference to FIG. 4. The message handling process 122 is again responsible for setting up and monitoring incoming SMTP connection attempts from sending electronic mail servers, such as the server 134, to receiving mail servers, such as the server 136, as well as for determining source and destination data associated with sent messages. The process 122 is connected to a two-strikes engine 132. The two-strikes engine 132 is configured to work with the message handling process 122, and the data the process 122 obtains. The engine 132 can additionally be configured to detect whether incoming email appears to be spam. In some alternative embodiments, this determination can be made by the process 122, and that detection provided to the engine 132. In some such embodiments the two-strikes engine 132 can receive along with the email some indication that it is suspected to be spam. In other such alternative embodiments, the system 130 can be configured to only receive email suspected to be spam, in which case no indicator to that effect would be needed. This spam detection can be based on any known spam detection method, for example, based on email content.

The engine 132 is connected to a two-strikes database 138. The engine 132 can use the database 138 for storing information related to instances of email suspected to be spam. The database 138 also stores IP address information, for example, IP addresses that have been determined by the engine 132 to be likely sources of spam. This information is made available for the RTIN engine 108.

Figure 6:
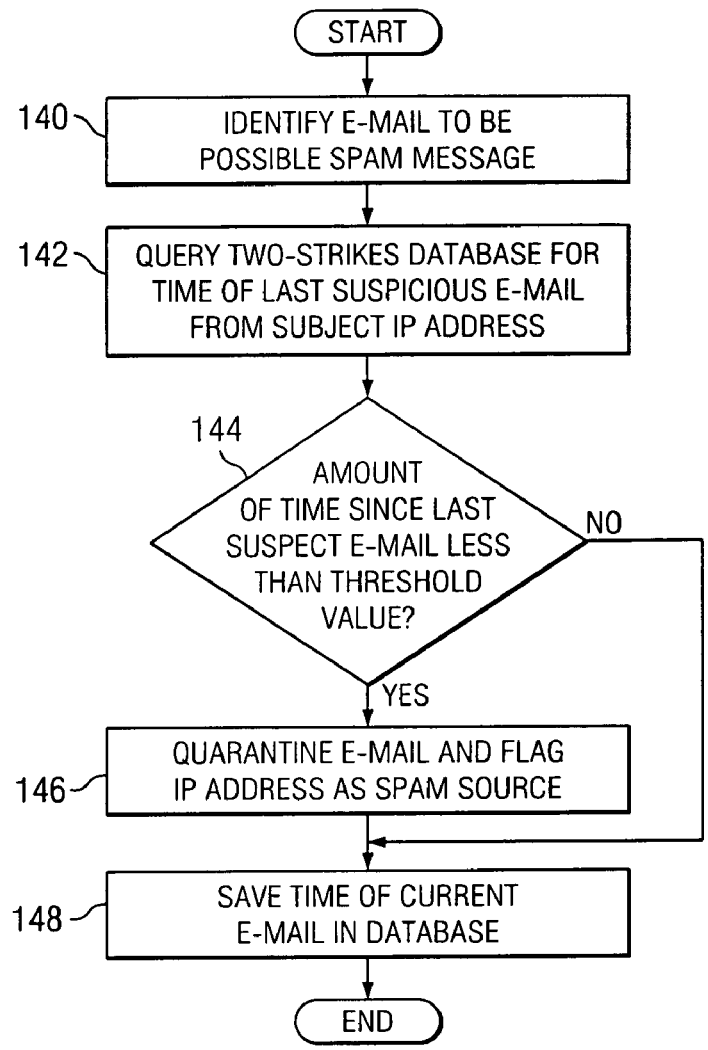
FIG. 6 shows a flowchart illustrating an embodiment of a process performed by the two-strikes system shown in FIG. 5.

FIG. 6 shows a flowchart illustrating the two-strikes process performed by the two-strikes system 130. At block 140, an incoming email from a subject IP address has been identified as having a high likelihood of being spam, for example, by the message handling process 122. At block 142, the two-strikes engine 132 queries the database 138 for the subject IP address. If a suspect email has previously been received from the subject IP address, then the database 138 will include the time at which the last suspect email was received. The two-strikes engine 132 retrieves the time of the last suspect email. Note that if no data exists for the subject IP address, the process can skip to block 148. At block 144, the engine 132 determines how much time has elapsed between the current suspect email and the previous suspect email and whether the amount of time is less than a predetermined threshold value, which can be any amount of time and can be set according to historical information. One example of a threshold value can be two hours. If the threshold amount of time has not elapsed ("YES" at block 144), then the email is considered spam and the process continues to block 146. At block 146, the email is quarantined or otherwise handled as spam. Also, the database 138 is updated to identify the source IP address of the spam email as a known source of spam. Next, at block 148, the database 138 is updated so that the time of the present suspect email replaces the time of the last suspect email for future iterations of this process. Note that, at block 144, if the threshold amount of time has elapsed ("NO" at block 144), then the process skips block 146 and proceeds to block 148.

Figure 7:
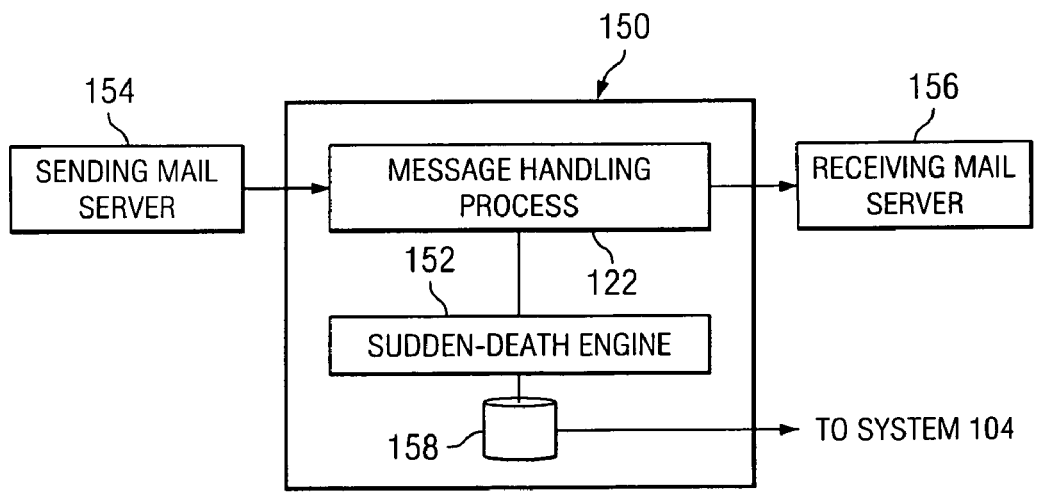
FIG. 7 shows a block diagram of an embodiment of a sudden-death system.

Still another example of a data source 102 can be a system for detecting spam based on received email that is addressed to known non-existent email addresses. FIG. 7 shows a block diagram of an embodiment of such a system. The system shown in FIG. 7 is a sudden-death system 150. The system 150 provides a way of identifying sources of spam based on instances of email messages addressed to non-existent email addresses. High volumes of emails sent to non-existent email addresses can be an indication of a DHA, so the source IP address can be identified as a source of DHAs and a likely source of spam. In some cases, "seed" email addresses that belong to no real user can be circulated on the Internet, "usenet," or other places. The system 150 can then detect email that is sent to one of these "seed" addresses and tag the source IP address as a likely source of spam.

The sudden-death system 150 again includes a message handling process 122, such as the process 122 described with reference to FIGS. 4 and 5. The message handling process 122 is again responsible for setting up and monitoring incoming SMTP connection attempts from sending electronic mail servers, such as the server 154, to receiving mail servers, such as the server 156, as well as for determining source and destination data associated with sent messages. The process 122 is connected to a sudden-death engine 152. The sudden-death engine 152 is configured to work with the message handling process 122, and the data the process 122 obtains. The engine 152 can additionally be configured to detect whether an addressee of an incoming email appears to be a non-existent address or a "seed" address. In some alternative embodiments, this determination can be made by the process 122, and then that determination provided to the engine 152. In some such embodiments the sudden-death engine 152 can receive along with the email some indication that it has been sent to a non-existent or "seed" address. In other such alternative embodiments, the system 150 can be configured to only receive email addressed to non-existent or "seed" addresses, in which case no indicator to that effect would be needed.

The engine 152 is connected to a sudden-death database 158. The engine 152 can use the database 158 for storing information related to instances of email addressed to non-existent or "seed" addresses. The database 158 also stores IP address information, for example, IP addresses that have been determined by the engine 152 to be likely sources of spam and/or DHAs. This information is made available for the RTIN engine 108.

Figure 8:
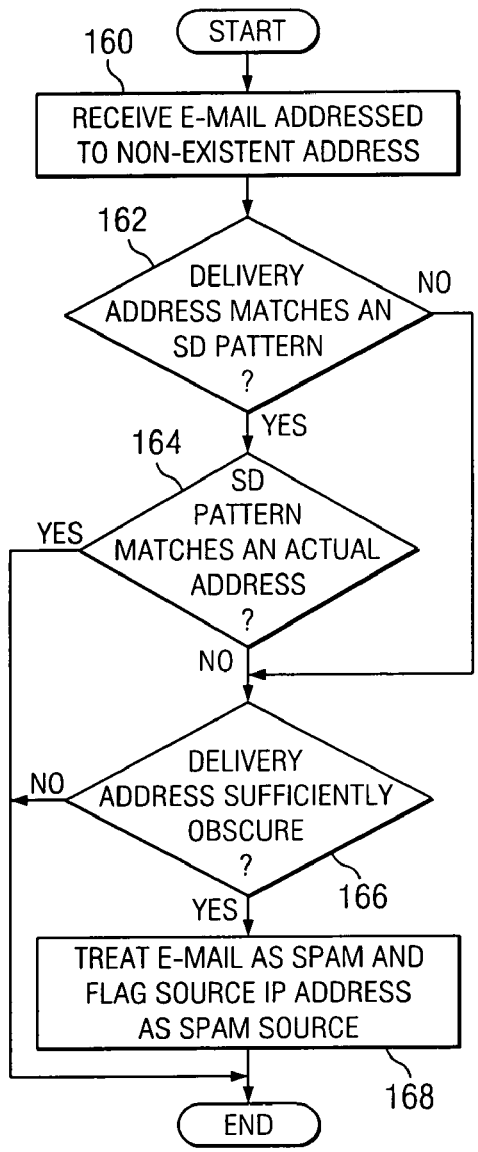
FIG. 8 shows a flowchart illustrating an embodiment of a process performed by the sudden-death system shown in FIG. 7.

FIG. 8 shows a flowchart illustrating the sudden-death process performed by the sudden-death system 150. At block 160, an incoming email from a subject IP address has been identified as having been sent to a non-existent email address, for example, by the message handling process 122. In some cases, this can mean that the subject email caused the receiving mail server 156 to generate a class 500 error, meaning that the receiving mail server 156 does not recognize the addressee of the email message. The email might also be flagged for having an addressee that matches a "seed" address or a sudden-death address pattern ("SD pattern"). An SD pattern is a mailbox (e.g., ptexql@) that is unlikely to be an actual mailbox. The sudden-death engine 152 can maintain a list of such SD patterns. At block 162, the sudden-death engine 152 determines whether the delivery address matches one of the SD patterns. If so, the process continues to block 164. Otherwise, block 164 is skipped. At block 164, the sudden-death engine 152 verifies whether the SD pattern is used in an existing, legitimate email address. For example, if the email is addressed to "ptexql@xyz.com", the mailbox "ptexql" will match the SD pattern "ptexql". However, it is possible that an email account might exist that also matches the SD pattern. So, at block 164, the sudden-death engine 152 can query the server for "xyz.com" to determine whether the mailbox "ptexql@xyz.com" actually exists. If so, the sudden-death process can end and the email can be delivered as usual. Otherwise, the process continues to block 166. Note that if, at block 162, the addressee does not match an SD pattern, the process also continues to block 166.

At block 166, a determination is made as to whether the delivery address is sufficiently obscure. For example, if the email is addressed to "ptexql@xyz.com" and a legitimate email account exists for "prexql@xyz.com" then, since the two addresses are very similar there is a good chance that the sender made an error when entering the delivery address. Thus, block 166 can include comparing the delivery address to existing addresses to determine whether the number of differences between the delivery address and any of the existing addresses is greater than a predetermined number of differences (e.g., characters), for example, more than one or two differences. If not, ("NO" at block 166) the sudden-death engine 152 treats the email as likely being a legitimate email that was incorrectly addressed. Otherwise, ("YES" at block 166), the email is treated as spam, and the sudden-death engine 152 updates the sudden-death database 158 to identify the source IP address as a likely source of spam.

Referring back again to FIG. 1, still further examples of a data sources 102 can include an IP address information database (or databases). The information can be provided by customers 106 who provide information regarding received spam and IP addresses that sent the spam. The information can also be provided by system administrators regarding IP addresses. An IP address information database can include block-lists, such as lists of IP addresses that are known sources of spam or other malicious activity. An IP address information database can include IP addresses that have been "gray-listed" as being trustworthy to some degree, for example, where the IP addresses are scored according to their degree of trustworthiness. An IP address information database can also include lists of trusted IP addresses that are known to be unlikely sources of spam or other malicious activity.

Trusted IP addresses can be identified through a process that involves identification of domains that would seem unlikely to be sending spam. This can include assigning trust levels to IP addresses based on anticipated behavior, where the trust levels span many degrees of likelihood that spam would or would not be sent out. The trust levels can be based on, among other things, business, industry or other heuristics.

IP addresses can be identified as being associated with certain industries, for example, a block of IP addresses might be identified as belonging to a financial or legal institution or even a "general trust" category that encompasses any number of generally trustworthy entities. In some embodiments, a category can be tied to a certain trust level, so IP addresses or domains assigned to a category are automatically assigned the associated trust level.

If, historically, a particular IP address is a known source of spam, or other malicious or undesirable Internet activity, this information can be maintained in an IP address information database. If, historically, an IP address is known to be a source of acceptable email or other Internet traffic, this information can also be stored in the IP address information database. In some embodiments, IP addresses can be flagged or rated based on historical information. A flag or rating can be indicative of acceptable or undesirable past activity. In some embodiments, an escalating activity detection system can be implemented that is capable of reducing the rating, e.g., indicating a reduced level of trustworthiness, of an IP address based on detection of an escalation of malicious activity originating from the IP address or block of addresses. An IP address can also regain improved ratings, e.g., become considered more trustworthy, if a notable reduction in spam or other malicious activity is detected over some span of time. This information can be updated at predetermined intervals based on real-time traffic information from Internet traffic monitors.

Figure 9:
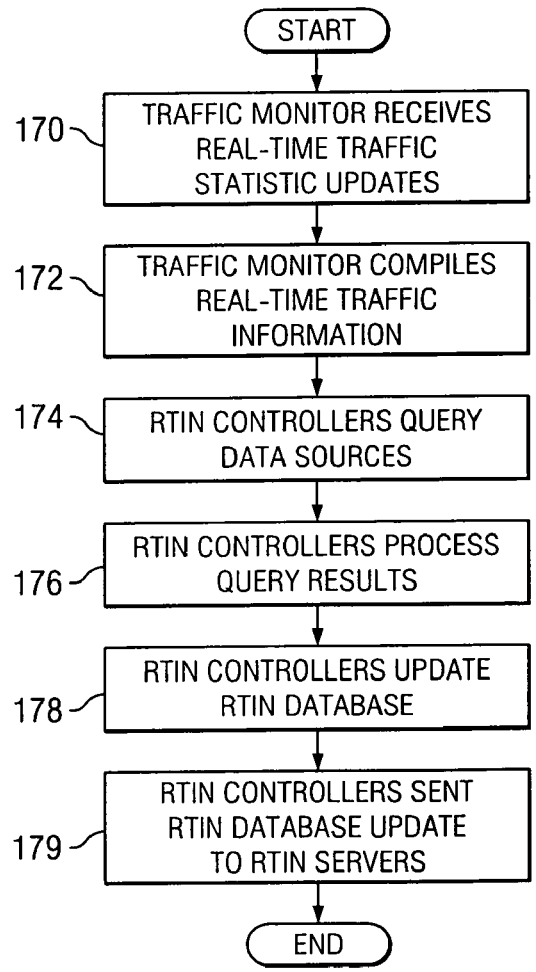
FIG. 9 shows a flowchart illustrating an embodiment of a process performed by the source reputation system shown in FIG. 1.

Turning now to FIG. 9, a flowchart is shown illustrating an embodiment of a process for populating the RTIN databases 114. In this embodiment, the traffic monitoring system 120 is available as one of the data sources 102.

Beginning with block 170, the traffic monitor 128 receives real-time traffic statistic updates. Then, as stated in block 172, the traffic monitor 128 collects real-time incoming SMTP connection data, message metadata, and message delivery information, including source and destination data. The source and destination data can include source data associated with the sending mail server 124, and destination data associated with the receiving mail server 126. Thus, the traffic monitor 128 stores real-time statistics according to source IP addresses for sending servers being routed through the system 120. In a particular implementation, the traffic monitor 128 can be responsible for maintaining relatively short-term information on all the sending servers or MTAS, for example, for sixty seconds. All those sending IP addresses are stored in a memory grid within the traffic monitor 128, which maintains multiple pieces of information about those source IP addresses, such as how many messages they have sent, how many "500 errors" they have generated or other types of errors, and how many spam messages they have sent based on content scanning. In some embodiments, at any time the traffic monitor 128 can be configured to only know what has happened during the last 60 seconds, although if a single connection is open longer than 60 seconds, the traffic monitor 128 can continue accumulating data on that connection for as long as the connection lives.

Next, as indicated in block 174 of FIG. 9, the RTIN engine 108 queries the data sources 102. In the present embodiment, this includes querying the traffic monitoring system 120, and sweeping the data stored in the traffic monitor 128. The sweeps of the traffic monitor 128 can be periodic, for example, more frequent than 60 seconds, such as occurring every 15 seconds. Ideally, the period of time between sweeps should be less than the amount of time data is retained in the traffic monitor 128.

The RTIN engine 108 can query additional data sources 102, such as those described above. For example, in some embodiments the RTIN engine 108 can query the two-strikes database 138, the sudden-death database 158, and/or other databases discussed above.

Once data has been collected from the various data sources 102, the RTIN engine 108 can process the results of the query as indicated in block 176 of FIG. 9. In the case of data collected from the traffic monitoring system 120, the RTIN engine 108 can collect the data in the traffic monitor 128 and, using an interpreter process, analyze this data in order to recognize patterns of messages within the traffic of messages that can be acted upon. The interpreter process can be an interpreter process such as described in the Active EMS patent application mentioned above. The interpreter process determines patterns associated with the electronic mail messages, or even behavior of the user sending the messages, by analyzing both the source and destination data and the metadata written to the traffic monitor. In some embodiments, the interpreter process can take into account data received from additional data sources 102.

As an exemplary approach, the interpreter process can identify four main types of attack—DHA, spam attack, the virus outbreak and the mail bomb/denial-of-service attack—although the RTIN databases 114 can be flexibly defined to identify many other types of information or attacks regarding particular IP addresses. As a specific example, if a source IP address is detected to be engaging in any one or more of these four attacks, a counter associated with that source IP address and the particular type of attack identified can be increased by one. As a specific example, if the RTIN engine 108 does a sweep through the traffic monitoring system 120 at midnight and determine that source IP address "XYZ" is engaging in a DHA, a single count can be added to that category in the associated "XYZ" source IP address entry in the RTIN database 114. If this was a new entry for this source IP address, then its associated score is DHA=1. If, in the next minute during a sweep, it is identified that the "XYZ" source is still attacking, its score will be incremented by one, yielding an updated associated score of DHA=2. This process can continue up to a maximum value of, for example, 99. If, for 99 straight sweeps, the source IP address "XYZ" is attacking somebody based on the traffic monitor analysis, then the counter would be incremented up to 99, which could be defined as a maximum.

As indicated in block 178 of FIG. 9, data resulting from the interpreter processing is used to update the RTIN database 114. Depending on the nature of the data received from the additional data sources, it may be suitable to update the RTIN databases directly with data received from some data sources 102 without the need for interpretive processing. For example, if one of the data sources 102 provides information that an IP address should be blocked.

An optional block 179 is shown where the RTIN controllers 116 push RTIN database updates out to the RTIN servers 118. This optional block would be used for embodiments such as the second embodiment shown in FIG. 3. Optional block 179 would not be necessary for other embodiments, such as the first embodiment shown in FIG. 2. Where block 179 is practical, it is provided so that the RTIN databases 114 at the RTIN servers 118 can be synchronized with the RTIN databases 114 at the RTIN controllers 116.

Note that while the traffic monitor 128 only maintains data for a short period of time, the RTIN database 114 can maintain accumulated and updated information about IP addresses for a much longer time.

There are a number of ways in which the customers 106 can utilize the source reputation information in the RTIN databases. One way is for the customer systems to make DNS-type inquiries regarding IP addresses that are requesting a TCP connection. An example of how such a DNS-type query can be performed by the customers 106 to the system 104 will next be described with reference to the flowchart shown in FIG. 10.

Beginning at block 180, a customer 106 receives a TCP connection request from a source IP address. For example, a source IP address may be attempting to establish an SMTP connection with the customer 106 in order to deliver an email message. The customer system 106 will query the source reputation system 104 before acknowledging the connection request. In some embodiments, as shown as block 182, the customer system 106 includes an RTIN client for generating an authenticated query with a valid key.

For a source reputation system 104 provided for a commercial subscription, it is desirable that the RTIN database 114 be accessible only to those who have paid for a subscription. Accordingly, the system 104 can provide for authenticated access to the RTIN database 114, whereby a security key is (in one exemplary approach) incorporated into the DNS-type look-up command sent from the RTIN customers 106. The format of the RTIN look-up command can be in a hashed security key that is prepended to the IP address to be looked up. Thus, for example, a hashed security key might be "45492147", and a particular IP address to be looked up might be 127.000.000.001. The fall command format in that instance might be then "RTIN.45492147.127.000.000.001.RTIN.postinicorp.com". Thus, the general approach is for the customer 106 to take the IP or "machine" address that it wants to look up, prepend an MD5-hashed security key before the IP address, and make a DNS-type inquiry to the RTIN engine 108. The RTIN access security keys can be periodically expired, which will increase the security of the system. As an exemplary approach, each key might be valid for a 60-day period, with new keys being provided every 30 days, whereby the successive keys would overlap by 30 days. The keys might be provided through any of a number of approaches, including by distribution over computer-readable medium or through secure online access and verification. Multiple sets of keys can be provided in advance, such that a particular subscriber might have 2 years worth of keys that can be updated by the subscriber periodically.

Next, at block 186, once the customer system 106 has gained access to the source reputation system 104, the customer system 106 queries the RTIN engine 108 for information regarding the source IP address. Then, at block 188, the RTIN engine 108 authenticates the request if authenticated queries are implemented and, at block 190, the RTIN engine 108 queries the RTIN database 114 for information related to the source IP address. At block 192 the RTIN database 114 returns to the RTIN engine the query results, if any. Then, at block 194 the RTIN engine 108 provides the query results to the customer 106.

In some embodiments, block 194 can include processing the query results according to customer preferences stored in the customer configuration database 110. For example, a customer configuration file stored in the database 110 may include lists of trusted or known-bad IP addresses. This list can be used to modify the information received from the RTIN database 114. For example, if the RTIN database 114 includes information that the source IP address is a likely source of spam and should be blocked, but the customer configuration includes information that a block of IP addresses including the source IP address should never be blocked, then the customer's preferences can take precedence such that the RTIN engine 108 can report that the source IP address is one that should not be blocked.

Finally, at block 196, the customer 106 receives the query results. At this point, the customer system 106 can respond to the connection request from the source IP address based on the query results and policies local to the customer 106.

Although the access approach described above is described as a DNS-type approach, the inquiries are not standard DNS inquiries. DNS inquiries, for example, typically involve the submission of a domain name to a DNS server, which will then return an IP address. The inquiries used to access the RTIN database are, conversely, IP addresses themselves, and the information returned is information that is known by the RTIN database about the particular IP address's characteristics as a sending email server.

Another way in which the customers 106 can utilize the source reputation information in the RTIN database 114 involves a process where the system 104 provides information directly to customer routers. A processes for how the RTIN data can be provided to customer routers will now be described in connection with FIGS. 11-13. This process builds on the techniques previously identified to apply them at the email packet/router level. Message routers across the Internet and in corporate intranets collectively develop packet routing paths through the millions of routers so that a message sent out into the Internet from the lowest-level IP address can find a route to its intended destination(s), adapting to message traffic processing speeds and propagation times through certain routers, and also adapting to routers being "down" or unavailable at times. This adaptability of packet routing schemes in the Internet has been one of the factors that has given the Internet its enormous popularity as a reliable means of delivering electronic messages for corporate, educational, and consumer users.

Standard protocols for sharing message routing paths for Internet routers have been developed by the "Request For Comment" (RFC) process by which the Internet community establishes its standards. Protocols developed over the years include the Exterior Gateway Protocol (EGP), which was widely used in the early days of the Internet, and the Border Gateway Protocol (BGP), which is progressively replacing EGP as the preferred Internet transport protocol. The most current BGP is Border Gateway Protocol 4 (BGP-4) and is described in RFC 1771.

Figure 11:
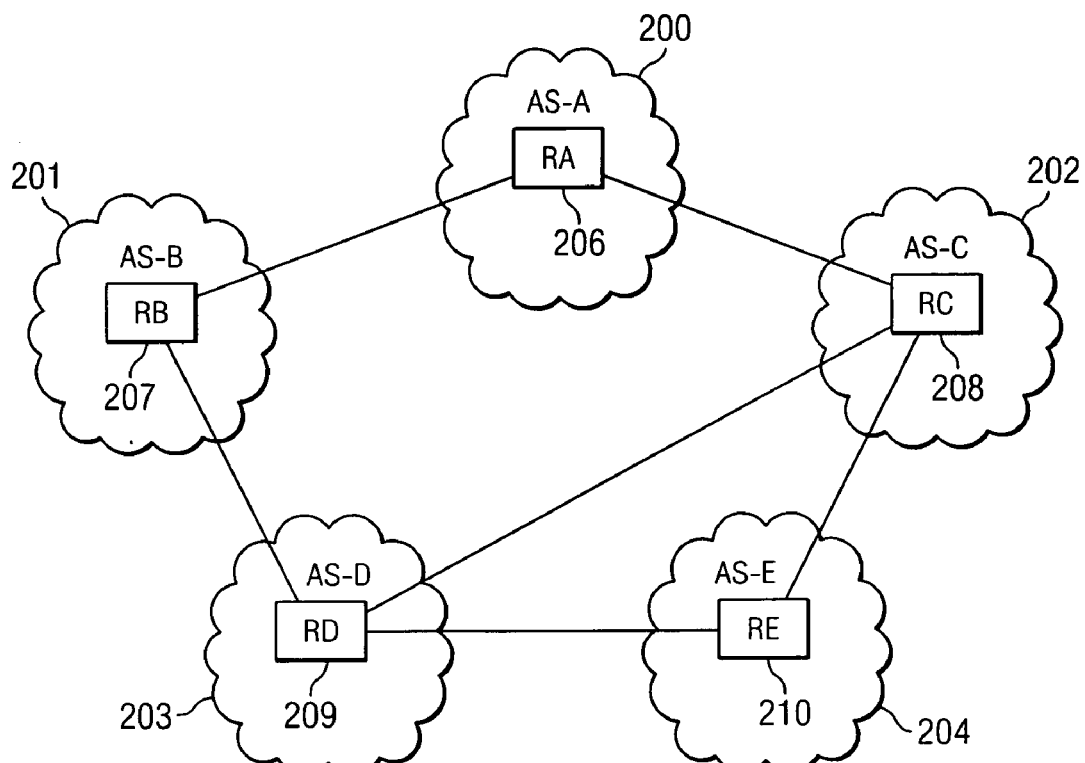
FIG. 11 shows a block diagram of a group of autonomous systems of the Internet.

In order to understand BGP, it helps to think of the Internet as a collection of autonomous systems. For example, a portion of the Internet can be depicted as the group of autonomous systems 200-204 shown in FIG. 11. Each autonomous system 200-204 can communicate directly with certain other autonomous systems 200-204 using border routers 206-210. In addition, each autonomous system 200-204 can communicate with other autonomous systems 200-204 that are not directly connected. For example, autonomous system (AS-A) 200 can communicate with autonomous system (AS-E) 204 using autonomous system (AS-C) 202 as a transit service. It's also possible that autonomous system (AS-A) 200 could communicate with autonomous system (AS-E) 204 using autonomous systems (AS-B) 201 and (AS-D) 203 as transit services. Thus, there are multiple paths from which router RA 206 could select in order to allow for communication between autonomous systems (AS-A) 200 and (AS-E) 204. Note that FIG. 11 provides only a very simplified view, for instance, communication is often relayed through internal routers of an autonomous system that is providing transit service.

In order for router RA 206 to request communication with router RE 210, it must first know of the path or paths to router RE 210. Router RA 206 can learn of possible paths from routers RB 207 and RC 208 using BGP. BGP is a protocol used by routers, such as routers 206-210, for exchanging network reachability information. So, in the example shown in FIG. 11, router RC 208 can use BGP to inform router RA 206 of the available path to AS-E 204; likewise, router RB 206 can use BGP to inform RA 206 of the available path to AS-E 204 by way of router RD 209 of AS-D 203 (assuming that router RD 209 has informed router RB 207 of the path to AS-E 204). This exchange of routing information usually occurs initially upon establishing a direct network connection, for example, when router RA 206 is initially connected with router RB 207. The router RA 206 will use the routing information received from router RB 207 to build a BGP routing table. Over time the BGP routing table can be updated as routing updates are received from router RB 207 (as well as from other routers, such as router RC 208).

Turning back to FIG. 1, the RTIN engine 108 can be configured to be in communication with routers 107*a* and 107*b* of the customer systems 106*a* and 106*b*, respectively. While each customer system 106 is shown with a single router 107, any number of routers 107 per customer 106 can be included.

FIG. 12 shows a block diagram of an example of a customer router 107. The router 107 includes a routing table 212 and a peering table 214. The RTIN engine 108 can be configured to communicate using BGP protocol. So, once the peering table 214 is appropriately configured to include the RTIN engine 108 as a peer, the RTIN engine 108 can instruct the router 107 to update the routing table 212, and provide routing data to be stored in the routing table 212 according to information stored in the RTIN database 114.

Thus, another feature of the RTIN engine 108 is that it can provide connection data to the customer routers 107 that effectively blocks certain IP addresses from establishing contact with the respective customer systems 106. The RTIN engine 108 queries the data sources 102 and forms an aggregate picture of Internet traffic. In some embodiments, the RTIN engine 108 can compare information gleaned from the Internet traffic data to customer preferences stored in the configuration database 110 and, based on this comparison, generate a list of offending IP addresses to be blocked for each customer's system 106. In other embodiments, predetermined thresholds or decision points can be used for generating the blocked-IP address list. The RTIN engine 108 then "pretends" to be a router with some specific knowledge of routes for a number of individual (or groups of) offending IP addresses. The RTIN engine 108 issues an update command to the routers 107 and relays blackhole routing information for the offending IP addresses using BGP to the routers 107. The routers 107 then update their respective routing tables 212 according to the new blackhole routing information received from the RTIN engine 108.

The blackhole routing information issued by the RTIN engine 108 replaces existing routing information for the offending IP addresses previously stored in the routing tables 212 with a blackhole route. A blackhole route is a route to a location other than the system associated with the offending IP address. In some embodiments, the blackhole route can be a route to an alternate location provided by the customers 106 and stored in the configuration database 110.

Figure 13:
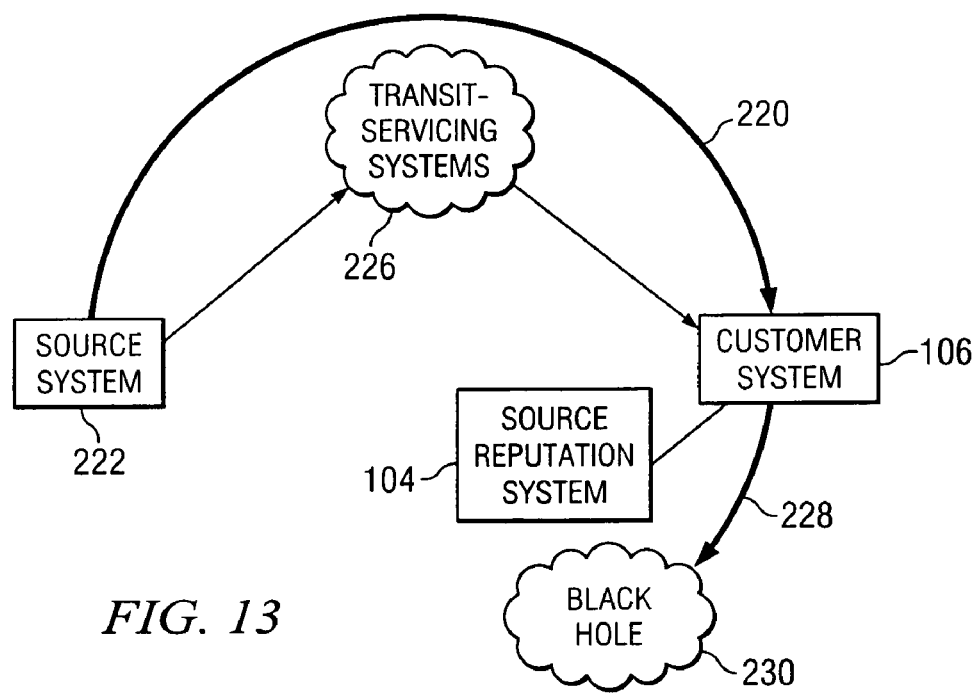
FIG. 13 shows a block diagram illustrating an example of traffic flow using a black-holing technique in concert with the source reputation system shown in FIG. 1.

The impact of replacing a legitimate route with a blackhole route will be explained with reference to FIG. 13. In FIG. 13, route 220 is a legitimate route from a source system 222 to a destination customer system 106. The route 220 can include routing through any number of transit-servicing systems 226.

In order for a TCP connection to be established between the source system 222 and the destination customer system 106, an exchange of messages or packets must occur between the two systems 222 and 106. The source system 222 can initiate an attempt to establish a TCP connection with the destination system 106 by sending a first packet to the IP address of the destination system 106. Once this first packet has been sent, the source system 222 waits for an acknowledgement from the destination system 106. The initial packet is transmitted along the route 220 and received by the destination system 224. Upon receiving this initial packet, the destination system 224 prepares and sends an acknowledgement packet. Assuming that the router of the destination system 106 knows of a legitimate route, which may or may not be the same as the route 220, back to the source system 222, the acknowledgement is sent back and received by the source system 222 and further communication between the source and destination systems 222 and 106 can occur.

On the other hand, suppose that the RTIN engine 108 has identified the source system 222 as an offending system. In some embodiments, this can mean that the source system 222 has exhibited certain behavior patterns that meet criteria set by the destination system 106. After the RTIN engine 108 has identified the source system 222, for example, by IP address or block of IP addresses, the RTIN engine 108 will instruct the router or routers 107 of the destination system 106 to update their routing tables 212 so that legitimate routes to the source system 222 are replaced with a blackhole route 228. Then, when the source system 222 subsequently attempts to establish a TCP connection with the destination system 106, the connection attempt will be unsuccessful. The source system 222 will send an initial packet addressed to the IP address of the destination system 106 and this initial packet will be delivered from the source system 152 via the legitimate route 150 to the destination system 106. In response, the destination system 106 will prepare and issue an acknowledgement message. However, since the only route to the IP address of the source system 222 that the routers 107 of the destination system 106 are aware of are blackhole routes, the acknowledgement message is not delivered to the source system 222. Instead, the acknowledgement message is directed to a blackhole address 230. After a certain period of time has elapsed, the attempted TCP connection made by the source system 222 will "time out" and the source system 222 will consider the destination system 106 unavailable or otherwise unreachable. Further communication from the source system 222 is thereby prevented.

Using a black-holing technique in combination with a source reputation system as described above, the source reputation system provides an objective, accurate and immediate identification of email threats and prevents such threats from manifesting by blocking communication with offending systems at the router level. Offending IP addresses are observed and listed in real-time, not through partial and ineffective manual reporting processes, which form the traditional real-time blacklists (RBLs), and are often subject to abuse. The source reputation system is also objective, in that it removes offenders automatically from the list once they clean up their messaging practices. Many RBLs today leave IP addresses on the list long after the suspected event. Solutions using the source reputation system assess threats based on probabilistic scores, rather than a simple yes/no process, enabling partners to make decisions on whether to accept email using layered analysis techniques. As a result, the source reputation system will result in fewer false positives, which are when legitimate IP addresses are mischaracterized as malicious.

The source reputation system, according to concepts discussed herein, allows for defense against directory harvest attacks, by which spammers attempt to "harvest" an enterprise's entire email directory by guessing at internal addresses and by registering in which instances a return "mailbox not found" message is not received. The source reputation system renders such an attack ineffective by making the entire target system appear to be unavailable or "not found". While RBLs typically only list IP addresses that are engaging in spam delivery or act as relays or conduits for spam delivery, the source reputation system offers insight into those that are performing directory harvest attacks and email-based denial-of-service attacks. The source reputation system tracks and correlates directory harvest attacks and spam attacks by source IP address, and the results have been alarming. DHAs can occupy up to 40% of a typical email server's incoming SMTP traffic and capacity and are typically a leading indicator of spam activity.

In addition to the advantages described above, which include real-time updating of a blacklist and the filtering of e-mail traffic at the router level, the implementation of the described real-time threat identification network allows the use of more sophisticated black lists or "gray" lists. These more sophisticated lists allow for both the addition and subtraction of offending source IP addresses from non-preferred routing or rejected routing paths. For example, if a first spam incident should come out of a source IP address, it is possible to defer adding that source IP address to a black list or graylist until such time as a second, third, fourth, etc., spam event is detected. This approach can avoid the unintentional addition of good and normally reliable source IP addresses to a black-hole list.

Another possible implementation allows for the respective timing for the demotion of a source IP address to a blacklist and for the promotion of that source IP address off of the blacklist. This timing could be such that a source IP address can be almost immediately added to a blacklist if a number of spam incidents occur originating from the source IP address, whereas if the source IP address remains clean for some period of time thereafter a parameter could be assigned to that source IP address for the gradual "graving" or decreasing in value of the parameter over time until the IP address is again considered completely clean. A BGP-RTIN router could then be adapted to have a threshold adjusted relative to this "graving" parameter to set when the source IP address can again be placed in the preferred routing tables.

In order to effect to these types of sophisticated blacklist and graylist approaches and other parameter management techniques, the traffic monitors 140 thorough 142 may be configured to store time and signatures for received and detected undesirable e-mail traffic incidents. That way, the time delays between spam incidents can be detected and the relative time for the gradual graying of a black-listed TIP address can be measured. As an example time-measurement period for the "two strikes" approach, there could be put in place a 10-minute time delay between spam incidents before it would trigger the blacklist and have a particular IP source address. As far as the graying of a black-listed source IP address, the time period for this could be one hour or longer, or it could be less, depending upon determined effectiveness.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CER 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as art admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, bat should not be constrained by the headings set forth herein.

What is claimed is:

1. A network traffic filtering system for filtering a flow of electronic messages across a computer network, the system comprising:

one or more computing devices;

an engine associated with a centralized server installed on the one or more computing devices, the engine executing instructions stored in a memory of the one or more computing devices, the execution of the instructions configured to:

generate reputation data and new reputation data for sources of messages by evaluating messages after being sent from a sending server and before being received by a targeted receiving server;

generate a source reputation profile for a source of a message by evaluating reputation data associated with that source of that message, wherein this evaluation comprises generating a reputation score for the source, the reputation score indicating a likelihood that electronic messages from the source are wanted or unwanted, and update the source reputation profile by evaluating new reputation data associated with the source, wherein this evaluation comprises generating an updated reputation score for the source, and wherein an updated reputation score different than the reputation score indicates a change in the likelihood that electronic messages from the source are unwanted;

a profile database associated with the engine for storing the reputation data, the reputation score, the updated reputation score, and the source reputation profile; and the centralized server connected to the profile database and external to the receiving server and a terminal connected thereto for receiving incoming messages from the receiving server, and the centralized server configured to provide the source reputation profile to an external local system including the receiving mail server, the source reputation profile for filtering incoming electronic messages received by the receiving mail server.

2. A system according to claim 1, wherein the updated reputation data is provided in real-time.

3. A system according to claim 1, wherein the source reputation profile comprises a list having at least one item of reputation data.

4. A system according to claim 1, wherein the reputation data comprises at least one selected from the group consisting of:
- the number of messages considered spam sent from the source;
- the number of messages considered legitimate from the source;
- the number of recipients on a message sent from the source;
- the number of connection attempts from the source;
- the number of connection successes from the source;
- the number of connection failures from the source;
- the number of connection currently open from the source;
- the number of 400-class errors caused by messaging attempts by the source;
- the number of 500-class errors caused by messaging attempts by the source;
- the average message size in bytes sent from the source;
- the average connection duration from the source;
- the number of messages containing viruses sent from the source;
- the number of message delivered from the source; and
- an overall number of messages sent from the source.

5. A system according to claim 1, wherein the engine is configured to additionally receive reputation data from a data source comprising a two-strikes system.

6. A system according to claim 1, wherein the engine is configured to additionally receive reputation data from a data source comprising a system identifying message sources by detecting messages sent to a deliberately established invalid destination address.

7. A system according to claim 1, wherein the engine is configured to additionally receive reputation data from a data source comprising a system determining whether a predetermined amount of time has elapsed since a first suspect message was sent from a particular source when a second suspect message is detected being sent from that source.

8. A system according to claim 1, wherein the engine is configured to additionally receive reputation data from a data source comprising a customer system, and the reputation data additionally comprises at least one list selected from the group consisting of blacklists, blocked senders lists, and gray-lists.

9. A system according to claim 1, wherein the engine is configured to additionally receive reputation data from a data source comprising approved senders selected using a business-based heuristics selection technique.

10. A system according to claim 1, wherein the engine is configured to provide the reputation profile via the server to the external system in response to a query received from the external system by the server.

11. A system according to claim 10, wherein the query comprises a DNS query corresponding to a source IP address of the source.

12. A system according to claim 1, wherein the updated reputation score replaces the reputation score on the database.

13. A system according to claim 1, wherein the server provides the reputation profile to an external system in the form of electronic message path data for use in a network router table of a router associated with the customer system to redirect electronic messages from the source.

14. A system according to claim 1, wherein the system further comprises a reputation data database associated with the engine and configured to store the reputation data.

15. A system according to claim 1, wherein the system further comprises a controller associated with the engine and the server, wherein the controller is configured to query a data source for reputation data, receive reputation data from a data source, evaluate the received reputation data to develop the source reputation profile, update the profile database, and the server is configured to distribute the source reputation profile or reputation data to external systems.

16. A system according to claim 1, wherein the external system is a customer system subscribing to use the filtering system.

17. A system according to claim 1, wherein the source comprises a source IP address.

18. A method of filtering a flow of electronic messages across a computer network, the method comprising:
- generating with an engine in a centralized server reputation data for sources of the electronic messages, the reputation data generated by evaluating messages after being sent from a sending server and before being received by a receiving server, the centralized server external to the receiving server and terminals connected thereto for receiving incoming messages from the receiving server;
- evaluating the generated reputation data;
- generating a reputation score for a source of a message based on the evaluation of reputation data for that source, the reputation score indicating a likelihood that electronic messages from the source are wanted or unwanted;
- providing a source reputation profile based on the reputation score from the centralized server to an external local system including the receiving mail server for filtering incoming electronic messages received by the receiving mail server;
- generating with the engine in the centralized server new reputation data for the source of the message, the new reputation data generated by further evaluation of messages being sent from a sending server at the source and before being received by the targeted receiving server;
- evaluating the generated new reputation data;
- generating an updated reputation score for the source, wherein an updated reputation score different than the reputation score indicates a change in the likelihood that electronic messages from the source are unwanted;
- updating the source reputation profile based on the updated reputation score; and
- providing the updated source reputation profile from the centralized server to the external local system.

19. A method according to claim 18, wherein updating the source reputation profile occurs in real-time.

20. A method according to claim 18, wherein providing the source reputation profile or providing the updated source reputation profile comprises providing a list having at least one item of reputation data.

21. A method according to claim 18, wherein the reputation data comprises at least one selected from the group consisting of:
- the number of messages considered spam sent from the source;
- the number of messages considered legitimate from the source;
- the number of recipients on a message sent from the source;
- the number of connection attempts from the source;
- the number of connection successes from the source;
- the number of connection failures from the source;

the number of connection currently open from the source;
the number of 400-class errors caused by messaging attempts by the source;
the number of 500-class errors caused by messaging attempts by the source;
the average message size in bytes sent from the source;
the average connection duration from the source;
the number of messages containing viruses sent from the source;
the number of message delivered from the source; and
an overall number of messages sent from the source.

22. A method according to claim 18, wherein receiving reputation data further comprises receiving reputation data from a two-strikes system.

23. A method according to claim 18, wherein receiving reputation data further comprises receiving reputation data from a data source comprising a system identifying message sources by detecting messages sent to a deliberately established invalid destination address.

24. A method according to claim 18, wherein receiving reputation data further comprises receiving reputation data from a data source comprising a system determining whether a predetermined amount of time has elapsed since a first suspect message was sent from a particular source when a second suspect message is detected being sent from that source.

25. A method according to claim 18, wherein receiving reputation data further comprises receiving reputation data from a customer system, and the reputation data comprises at least one list selected from the group consisting of blacklists, blocked senders lists, and gray-lists.

26. A method according to claim 18, wherein receiving reputation data further comprises receiving reputation data comprising approved senders selected using an business-based heuristics selection technique.

27. A method according to claim 18, wherein providing further comprises providing the source reputation profile or the updated source reputation profile to a customer system in response to a query received from the customer system.

28. A method according to claim 27, wherein the query comprises a DNS query corresponding to a source IP address of the source.

29. A method according to claim 18, the method further comprising storing the reputation score in a database associated with the centralized server, and replacing the reputation score with the updated reputation score.

30. A method according to claim 18, wherein providing further comprises providing the source reputation profile or the updated source reputation profile to a customer system in the form of electronic message path data for use in a network router table of a router associated with the customer system to redirect electronic messages from the source.

31. A method according to claim 30, wherein the electronic messages are redirected to a black hole in the network.

32. A method according to claim 18, wherein providing comprises providing the source reputation profile or the updated source reputation profile to a customer system subscribing to use the filtering method.

33. A method according to claim 18, the method further comprising storing the reputation data, the reputation score, the updated reputation score, and the source reputation profile.

34. A method according to claim 18, wherein the source comprises a source IP address.

35. A computer-readable medium comprising program code for filtering a flow of electronic messages across a computer network, program code executable by a computer to perform the steps of:
generating with an engine in a centralized server reputation data for sources of the electronic messages, the reputation data generated by evaluating messages after being sent from a sending server and before being received by a receiving server, the centralized server external to the receiving server and terminals connected thereto for receiving incoming messages from the receiving server;
evaluating the generated reputation data;
generating a reputation score for a source of a message based on the evaluation of reputation data for that source, the reputation score indicating a likelihood that electronic messages from the source are wanted or unwanted;
providing a source reputation profile based on the reputation score from the centralized server to an external local system including the receiving mail server for filtering incoming electronic messages received by the receiving mail server;
generating with the engine in the centralized server new reputation data for the source of the message, the new reputation data generated by further evaluation of messages being sent from a sending server at the source and before being received by the targeted receiving server;
evaluating the generated new reputation data;
generating an updated reputation score for the source, wherein an updated reputation score different than the reputation score indicates a change in the likelihood that electronic messages from the source are unwanted;
updating the source reputation profile based on the updated reputation score; and
providing the updated source reputation profile from the centralized server to the external local system.

36. A computer readable medium according to claim 35, wherein providing the source reputation profile or providing the updated source reputation profile comprises providing a list having at least one item of reputation data selected from the group consisting of:
the number of messages considered spam sent from the source;
the number of messages considered legitimate from the source;
the number of recipients on a message sent from the source;
the number of connection attempts from the source;
the number of connection successes from the source;
the number of connection failures from the source;
the number of connection currently open from the source;
the number of 400-class errors caused by messaging attempts by the source;
the number of 500-class errors caused by messaging attempts by the source;
the average message size in bytes sent from the source;
the average connection duration from the source;
the number of messages containing viruses sent from the source;
the number of message delivered from the source; and
an overall number of messages sent from the source.

37. A computer readable medium according to claim 35, wherein receiving reputation data further comprises receiving reputation data from:
a two-strikes system;
a data source comprising a system identifying message sources by detecting messages sent to a deliberately established invalid destination address;

a data source comprising a system determining whether a predetermined amount of time has elapsed since a first suspect message was sent from a particular source when a second suspect message is detected being sent from that source;

a customer system, and the reputation data comprises at least one list selected from the group consisting of blacklists, blocked senders lists, and gray-lists; or a data source comprising a list of one or more approved senders selected using an business-based heuristics selection technique.

38. A computer readable medium according to claim 35, wherein the source comprises a source IP address.

* * * * *